United States Patent [19]

Finn et al.

[11] 4,136,075
[45] Jan. 23, 1979

[54] ACRYLIC COPOLYMER COATINGS

[75] Inventors: William M. Finn, Decatur, Ill.;
Michael C. Peck, Savannah, Ga.;
Maynard R. Winstead, West Peabody, Mass.

[73] Assignee: A. E. Staley Manufacturing Company, Decatur, Ill.

[21] Appl. No.: 791,453

[22] Filed: Apr. 27, 1977

[51] Int. Cl.² ............................................. C08L 33/00
[52] U.S. Cl. .................... 260/29.6 TA; 260/29.6 H;
260/29.6 N; 260/29.6 E; 427/338 R; 427/388
C; 427/388 D; 428/215; 428/216; 428/463
[58] Field of Search ................ 260/29.6 H, 29.6 TA,
260/29.6 N, 29.6 E; 427/388 R, 388 C, 388 D;
428/215, 216, 463

[56] References Cited

U.S. PATENT DOCUMENTS

| 2,976,203 | 3/1961 | Young et al. | 260/29.6 TA |
|---|---|---|---|
| 2,976,204 | 3/1961 | Young et al. | 260/29.6 TA |
| 3,245,932 | 4/1966 | Glavis et al. | 260/29.6 TA |
| 3,431,226 | 3/1969 | Warson et al. | 260/29.6 TA |
| 3,825,514 | 7/1974 | Drury, Jr. et al. | 260/29.6 TA |
| 3,980,602 | 9/1976 | Jakubauskas | 260/29.6 TA |
| 3,991,216 | 11/1976 | Christenson et al. | 220/1 BC |
| 4,049,607 | 9/1977 | Berghoff | 260/29.6 TA |

FOREIGN PATENT DOCUMENTS 668832 8/1963 Canada ............................. 260/29.6 TA Primary Examiner—Melvyn I. Marquis
Attorney, Agent, or Firm—M. Paul Hendrickson;
Charles J. Meyerson

[57] ABSTRACT

Acrylic copolymer solutions having a $T_g$ less than 0° C., a weight average molecular size ranging from about 20,000 to about 50,000 and consisting essentially of about 4–14% ethylenically unsaturated acid, about 80–95% methyl acrylate and/or ethyl acrylate and about 1–8% lower alkyl methacrylate are obtained by copolymerizing the comonomers in the presence of an organic solvent which functions as a chain terminator. Water-borne, heat-curable, internal can coating compositions may be prepared by formulating these acrylic copolymer solutions with aqueous ammonia and a water-dispersible, cross-linking reagent.

40 Claims, No Drawings

ACRYLIC COPOLYMER COATINGS

BACKGROUND OF THE INVENTION

A host of water-soluble acrylic copolymers have been proposed. Such copolymers have been proposed for use in a multitude of products. It is known that the molecular weight, molecular distribution, the type of copolymerized monomers and their amounts will have a substantial affect upon the acrylic copolymer properties. It is also known that the manner in which these acrylic copolymers are prepared will affect its ultimate character, properties and functionality. The catalyst system, nature of the polymerization reaction (e.g., solvent, emulsion, etc.), dispersants and solvent system, reaction temperature, presence or absence of chain terminators, etc. are factors which bear upon the acrylic copolymer properties.

The interior of metal containers (steel, tin, aluminum, etc.) and their closures such as caps and lids are conventionally coated with resinous materials to protect the contained products from metal contamination. These metal interiors are typically coated (e.g., brushing, spraying, dipping, rollercoating, etc.) with a thermosetting formulation which when baked provides a water-resistant, solvent-resistant, thermoset coating. These thermoset coatings must meet stringent standards to qualify for such an end-use. During the coating application stage, the thermosetting formulation must readily adhere and uniformly coat the metallic container part. The formulation should lend itself to use in high-speed can coating operations. Non-uniformity or incomplete or non-adherence of the coating upon the metallic surface will frustrate its coating functionality.

The resin should also be capable of converting quickly and easily to an inert, thermoset, protective internal coating. The cured coating should possess a high degree of resistance towards physical and chemical degradation. It must also be sufficiently inert to protect the contained product from deterioration under such adverse conditions frequently encountered during its storage and shipment in commerce. Certain canned beverages (e.g., beer, soft drinks, etc) are reportedly susceptible to adulteration (e.g., adverse development of flavor, color, etc.), by extractable trace adulterants from the cured coating. Can coatings are frequently evaluated on the basis of blush resistance, adhesion, turbidity and fracture tests (e.g., see U.S. Pat. No. 3,219,729) as well as their resistance towards water, organic solvents, foods, chemicals, etc.

Organic solvent-based, epoxy-urea coatings have been used to interiorly coat cans (e.g., see U.S. Pat. No. 3,219,729). These can coatings reportedly have sufficient adhesion and flexibility so as to permit fabrication of coated sheets into can bodies, can ends, jar lids, bottle caps and other formed container components. These can coatings rely upon volatile organic solvents as a vehicle. Due to environmental, health and safety considerations, these organic based coating compositions have increasingly become subject to a greater degree of regulation and scrutiny by governmental bodies.

Attempts have been made to replace organic solvent-based, internal can coatings with water-based, thermosetting, coating systems. U.S. Pat. Nos. 3,996,182 and 3,957,709 disclose water-based systems which are reportedly useful as internal can coatings. These attempts have not been completely successful. Water-borne, internal can coating systems which preserve the taste, flavor and over-all quality of contained beverages while complying with the FDA and air pollution requirements would be a desirable goal. Such a system would provide an effective alternative to the existing organic-solvent-based coating system.

OBJECTS

It is an object of the present invention to provide an acrylic solution copolymer which can be readily converted to a water-soluble form and used as a water-borne system to coat metallic objects.

Another object is to provide a water-borne and heat-curable coating composition and thermoset articles thereof.

A still further object of the invention is to provide a new method to internally coat metal cans with a water-borne and heat-curable coating composition.

An additional object is to provide a novel, water-soluble acrylic copolymer which in conjunction with water-dispersible, cross-linking reagents provides an effective water-borne, internal can coating system.

Another object of the invention is to provide a water-borne interior metal can coating system which is inert and resists deterioration or contamination of food products stored in such containers.

DESCRIPTION OF THE INVENTION

According to the present invention there is provided an acrylic solution copolymer suitable for use in conjunction with cross-linking reagents to provide a thermoset, water-resistant and solvent-resistant, internal can coatings, said copolymer comprising the copolymerization product of:

(a) 5 to less than 16 parts by weight of at least one alpha-beta ethylenically unsaturated carboxylic acid selected from the group consisting of acrylic acid and methacrylic acid;

(b) 100 parts by weight of at least one monomer selected from the group consisting of methyl acrylate and ethyl acrylate; and (c) 0 to 13 parts by weight of a comonomer represented by the structural formula:

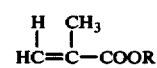

wherein R is an alkyl group of 1 to 4 carbon atoms inclusive; said copolymer being further characterized as having a $T_g$ less than 10° C., an average molecular weight of about 20,000 to about 80,000, soluble in n-Propanol at 25° C. and 50% by weight acrylic copolymer solids level and forming a water-soluble, acrylic copolymer when neutralized with ammonia to a pH ranging from about 7 to about 9.

The novel acrylic solution copolymers of this invention may be effectively used as a replacement for the organic solution resins to internally coat cans. The acrylic solution copolymers are obtained by copolymerizing certain comonomer combinations and proportions under rather specific and limited polymerization conditions.

The copolymerized acrylic and/or methacrylic acid units are needed to provide the reactive sites for the cross-linking reagents (e.g., aminoplasts, epoxy resins, etc.). If excessive carboxylic acid moieties are present in the copolymer chain, the thermoset coating becomes too wear-sensitive when fully cured. Acrylic copolymers which contain from 8 to 13 parts by weight acrylic and/or methacrylic acid (preferably 10 ±1 pbw methacrylic acid) are particularly effective in internal can coating formulations. During the coating operation and in the cured coating, the polymeric acid moieties improve upon the wetting, leveling and adherence functionality of the copolymer to metal substrates.

The methyl acrylate and ethyl acrylate when properly combined with the other acrylic comonomers within a certain molecular weight range provide a thermosettable acrylic copolymer with sufficient softness and pliability to counteract the brittleness which arises from cross-linkages in the cured coating. Through the selection of a soft acrylic copolymer, the cured coatings of this invention are internally plasticized to a degree sufficient to be useful in fabricating can bodies, can ends and closures. Although either ethyl acrylate or methyl acrylate may be used separately (B), certain combinations of methyl and ethyl acrylates are most effective. It is advantageous for the methyl acrylate content of the copolymer to comprise at least 25% of the total methyl acrylate and ethyl acrylate weight. Comparatively, methyl acrylate imparts a higher degree of polarity to the acrylic copolymer than ethyl acrylate. This contributes to improved metal adhesion and solubility of the copolymer in aqueous vehicles. In addition, methyl acrylate has a higher homopolymer $T_g$ than ethyl acrylate and therefore reduces the copolymer tack. The ethyl acrylate renders the acrylic copolymer softer and significantly reduces brittleness in the cured product. On a total ethyl acrylate and methyl acrylate weight basis, it is particularly advantageous for the methyl acrylate to comprise at least about a major portion of the total comonomer (B) weight. In the more limited embodiments of this invention, the acrylic solution copolymer contains a combination of copolymerized methyl acrylate and ethyl acrylate at a weight ratio of about 3:1 to about 1:2 and most preferably from about 3:2 to about 2:3. In the most preferred embodiments of the invention, methyl acrylate is the most predominant copolymerized comonomer followed by ethyl acrylate as the second most predominant copolymerized monomer. Acrylic copolymers containing at least 85% (preferably at least 90%) copolymerized methyl acrylate and ethyl acrylate (on a total copolymer weight basis) are particularly effective in internal can coating formulations.

In addition to monomers (A) and (B), the acrylic solution copolymer may contain up to 13 parts by weight of an alkyl methacrylate comonomer (i.e., (C)). As mentioned above, the efficacy of the acrylic solution copolymer is improved when both methyl acrylate and ethyl acrylate are present. Unfortunately, the optimum effectiveness of these two copolymerized monomers is best achieved at concentrations which impart excessive tackiness and softness to the copolymer. Since the alkyl methacrylates are generally harder (i.e., higher $T_g$) than the alkyl acrylates, excessive tack and softness may be alleviated by copolymerizing therewith from about 1 to 13 parts by weight alkyl methacrylate. The $C_1$-$C_2$ alkyls of methacrylate (preferably methyl methacrylate) at a level from 2 to 9 parts by weight for each 100 parts by weight ethyl acrylate and methyl acrylate are particularly effective for this purpose.

Monomers (A), (B) and (C) are most suitably copolymerized under conditions to provide a copolymer having a measured $T_g$ between −40° C. to 10° C. and a molecular weight ranging from about 20,000 to 50,000. Further improvement in the coating will be achieved when the acrylic solution copolymer has a molecular weight ranging from about 25,000 to 40,000 and a $T_g$ from about −30° C. to 0° C. The most effective acrylic solution copolymers have a $T_g$ ranging from about a −20° C. to a −5° C. and a molecular weight of less than about 30,000.

The molecular weight of the acrylic solution copolymer can be effectively controlled by the polymerization conditions used in its preparation. This may be accomplished by copolymerizing monomers (A)-(C) in the presence of a water-soluble catalyst system (e.g., hydrogen peroxide) and a water-miscible organic solvent which functions as a chain transfer agent or terminator for the copolymer during the copolymerization reaction. Since water-soluble catalysts such as hydrogen peroxide often fail to have sufficient catalytic activity at the polymerization temperature best suited to prepare the acrylic polymers herein, water-soluble activators may be used to activate the catalyst system (e.g., redox catalysis). A particularly effective water-soluble redox catalyst system is hydrogen peroxide activated by either erythorbic acid or ascorbic acid. In general, the hydrogen peroxide concentration typically ranges from about 2% to about 5% of the copolymer monomer weight with a level between about 3% to about 4% being preferred. In combination with hydrogen peroxide, activator concentrations (preferably ascorbic acid) ranging from about 0.5% to about 2% the monomer weight (preferably about 1% to 1.5%) are effective.

The polymerization media contains a water-miscible organic solvent. The polymerization solvent dually serves as a solvent for the monomers and a chain terminator or transfer agent to regulate the acrylic copolymer molecular weight. Polar organic solvents (typically having a molecular weight of less than 200) may be used. Illustrative thereof are the lower alkanols (e.g., $C_1$-$C_4$ alcohols), esters (e.g., ethyl acetate), glycols, glycol ethers, glycol esters, glycol ether esters, ketones, etc. Alkanols of 2-3 carbon atoms such as ethanol, isopropanol and n-propanol alone or in combination with other organic solvents (e.g., ethyl acetate) are especially useful chain terminating solvents and particularly the $C_3$ alkanols. On a comparative basis, n-Propanol is less effective as a chain terminator than isopropanol. By selecting the polar solvent upon the basis of its effectiveness or by combining a highly effective chain terminator with a less effective chain terminator solvent in varying proportions, the acrylic copolymer molecular weight can be regulated and controlled. For example, acrylic copolymers of a low molecular weight can be obtained by using isopropanol alone. If ethyl acetate is used as a copolymerization media co-solvent along with isopropanol, the acrylic copolymer molecular weight will proportionally increase as the level of ethyl acetate is increased.

The weight ratio of total solvent to monomer in the reaction media may vary considerably. Since the resultant copolymerizates are characterized as having a relatively low molecular weight and a low viscosity, the copolymerization reaction is particularly well suited for those processes wherein a major weight portion of the total charge to the reactor comprises the comonomer charge. Theoretically the total comonomer weight charge may be reduced to a much lower level (e.g., 20% or lower) without adversely affecting the copolymerizates functionality. Such a monomer concentration reduction, however, results in an unfavorable increase in production costs. For can coating applications, it is desirable to increase the copolymer solids level to as high a level as possible. This will avoid the need to remove excess solvent from the acrylic copolymer solution when it is desired to provide a copolymer solution that can be effectively formulated with other coating ingredients to meet the most stringent air pollution standards. Advantageously, the copolymerizate will comprise from about 60% to about 80% of the total reaction media weight with a dry copolymerizate solid weight of at least 65% being preferred.

The copolymerization reaction may be conducted in the presence or absence of water. Water, however, provides a convenient carrier for the catalyst system. In the absence of water, the catalyst system may be directly charged to the reactor (e.g., single-load, bulk polymerization reaction) or alternatively dispersed into the organic polar solvent feed or separately fed to the reactor by incremental or continuous catalyst addition to control the copolymerization rate. The copolymerization reaction temperature as well as the weight average molecular size and $\overline{A}_w/\overline{A}_n$ factor of acrylic copolymer are most appropriately achieved by incrementally or continuously charging the copolymerization media with a predetermined portion of the organic polar solvent, monomers and catalyst system at a regulated rate throughout the polymerization reaction. For a water-soluble, redox catalyst system such as hydrogen peroxide and ascorbic acid, the reaction temperature and rate of copolymerization may be controlled by regulating the level of catalyst which is present in the copolymerization media. Water is the most suitable solvent or carrier for these water-soluble, redox catalyst systems. When water is used for this purpose, it advantageously comprises less than 35% of the total organic polar solvent weight used to prepare the acrylic copolymer solution. Most typically the organic polar solvent to water weight ratio will range between about 3:1 to about 15:1 with about 4:1 to about 9:1 being preferred. The amount of water present in the polymerization reaction media will affect the molecular weight of the acrylic copolymer. By increasing the amount of water in the polymerization reaction, the alcohol chain transfer concentration becomes diluted and its effectiveness correspondingly decreases with a concomitant increase in the molecular weight of the acrylic copolymer.

The copolymerization temperature is maintained at a level sufficient to provide an acrylic copolymer having the aforementioned $T_g$ and molecular weight characteristics. The type of reactor and catalyst system are directly related to the most suitable reaction temperature. In general, the reaction temperatures may range from about 70° C. to about 120° C. with a reaction temperature of about 80° C. to about 100° C. being most typical. When hydrogen peroxidee and ascorbic acid or erythorbic acid are used, the most suitable reaction typically ranges from about 85° C. to about 100° C. and preferably between about 90° C. to about 95° C.

The exothermic polymerization reaction may be conducted batchwise or continuously. The rate of polymerization and reaction temperature are regulated by controlling the monomers and/or catalyst feed water to provide the appropriate copolymer $T_g$ and weight average molecular weight. This is best achieved by initially charging the reactor with a minor portion of the total comonomer solvent and catalyst charge and thereafter incrementally or continuously adding the balance to the polymerization media until the reaction is essentially completed. This delayed monomer addition technique improves upon both the molecular weight distribution and the copolymerized comonomer sequence distribution in the acrylic copolymer. This results in more uniform distribution of the carboxylic acid moieties throughout the acrylic copolymer molecular chains and a molecular size which both contributes to significant improvements in the cured coatings. The temperature of the copolymerization reaction is conveniently controlled by the rate at which the monomers, catalyst and/or activators are charged to the reactor. Upon completion of the monomeric additions, it is desirable to apply external heat to drive the copolymerization reaction towards completion. Residual and unreacted comonomers may be copolymerized by feeding additional catalyst (e.g., hydrogen peroxide) to the reactor and allowing the polymerization reaction to proceed for an additional period of time. Post catalysis can effectively reduce the total free comonomer content of the copolymerizate to a level of less than 0.3% free comonomers (based on total weight comonomer charge) and preferably to a level of less than 0.1% unpolymerized comonomers. The copolymerization reaction is advantageously conducted in a closed reactor system in the presence of an inert gas (e.g., nitrogen at about 0 to about 5 psi). It is continued for a period of time sufficient to yield the desired $T_g$ and molecular weight. The copolymerization reaction typically requires from about 3 to 10 hours.

In addition to the weight-average molecular size, the molecular weight distribution of the acrylic copolymer is a significant factor in achieving a cross-linkable polymer which can be effectively cured into a uniform coating for internal can coating applications. Acrylic copolymers which upon gel permeation chromatographic analysis exhibit a relatively narrow and symmetrical bell-type curve, evince good performance in internal can coating formulations. As understood by the art, the molecular weight distribution of a polymer can be ascertained upon the basis of its $\overline{A}_w/\overline{A}_n$ ratio (i.e., weight-average molecular weight size in angstroms/number-average molecular size in angstroms). In general, the acrylic copolymer $\overline{A}_w/\overline{A}_n$ ratio is less than 5 and most typically within the range of 1 to 4. For internal can coating applications, the $\overline{A}_w/\overline{A}_n$ ratio will advantageously range from about 1.5 to about 3.0 and most preferably at a $\overline{A}_n$ to $\overline{A}_w$ ratio from about 7:4 to about 10:4.

If desired, excess organic solvent may be partially removed by distillation and recycled for reuse in preparing additional acrylic solution copolymers. The concentrated acrylic copolymer solution may then be shipped to the can fabricator who neutralizes the concentrate with an aqueous, volatile base solution to the appropriate viscosity level for internal can coating applications. Alternatively, the acrylic copolymer solution may be directly neutralized with an aqueous, volatile base solution and thereby converted to a form suitable for internal can coating operations. Organic nitrogen bases such as disclosed in U.S. Pat. No. 3,951,892 by Drury et al. may be used for coating cans. Ammonium hydroxide is the most suitable neutralizer for internally coating cans which are used in direct contact with food products with the added benefit under pollution control standards of permitting a higher organic solvent loading in the coating formulation. Water alone or combinations of water and water-miscible organic solvents may be used as a volatile solvent system for coating formulations which contain the neutralized acrylic copolymers of this invention. Compliance with stringent air pollution regulations such as Rule 66 of the Los Angeles Air Pollution Control District (adopted by a majority of air pollution districts) can be conveniently met by simply reducing the volatile organic concentration of the coating formulation to 20% by volume or less. As illustrated in the Examples, an acrylic copolymer solution (at 70% dry solids level) may be conveniently neutralized and diluted with an aqueous-volatile base and combined with the other coating formulation ingredients to provide a coating formulation which contains less than 20% by volume volatile organics.

An acrylic copolymer of a relatively low molecular weight (e.g., less than 35,000) retains sufficient fluidity and flow properties so as to remain pourable under ambient conditions at a high copolymer solids level (e.g., at 70% dry copolymer solids). Acrylic copolymer solutions consisting essentially of acrylic copolymers of weight-average molecular weight size within the 20,000 to 30,000 range typically have a Brookfield viscosity at 25° C., 20 r.p.m. (at 70% non-volatile solids) of less than 20,000 cps and most typically will have a Brookfield viscosity ranging from about 7,500 to less than about 15,000 cps. These low viscosity and high-solids acrylic copolymer solutions can be easily mixed with aqueous solutions containing the volatile base neutralizer and other coating formulating ingredients to provide a heat-curable coating composition. The acrylic copolymer solution is generally neutralized with a sufficient amount of a volatile base to raise its pH to a level of 6.5 or higher. The viscosity characteristics of the acrylic copolymer for coating applications and its stability are significantly improved by completely neutralizing the acid moieties with a sufficient amount of volatile base to convert the copolymer solution to a basic pH (e.g. pH 7.0 or higher). At the more elevated pH levels (e.g. in excess of the 10.0), the curing rate of thermosetting coating formulations thereof is slower than those having a pH range from about 7.0 to about 10.0. Advantageously, the acrylic copolymer solution is neutralized with aqueous ammonia within the pH range of about 7.5 to about 9.0 and preferably between about 8.0 to about 8.5. The acrylic copolymer solutions and coating compositions formulated therewith generally possess excellent stability against separation even after storage for a prolonged period of time.

Because the acrylic copolymer solutions may be suitably provided at a relatively high solids level (e.g. 65-75% by weight dry solids with the balance essentially volatile organic solvent), such solutions may be easily diluted to a functional coating viscosity level to provide a curable coating formulation which contains less than 20% by volume organic volatiles. In general, the curable coating formulations will contain about 5% to about 50% by weight acrylic copolymer solids (based on total coating formulation weight) and have a Brookfield viscosity ranging from about 10 cps to about 1000 cps. The viscosity of the coating formulations and the acrylic copolymer content will vary and depend largely upon the applicator which is used to coat the substrate. Most coating formulations will typically have a Brookfield viscosity ranging from about 50 cps to about 500 cps (#1 or 2 spindle, 25° C. and 20 r.p.m.) and a dry acrylic copolymer content (based on total coating formulation weight) ranging between 10 to 35% by weight. The lower viscosity and reduced acrylic copolymer content levels are generally most suitable for spray coating applications (>25 cps) and the higher viscosity and acrylic copolymer levels for roller coating applications. Brookfield viscosities of about 100 cps to about 350 cps at an acrylic copolymer dry solids level ranging from about 15% to about 25% are generally applicable to most spray and roller coating operations.

The acrylic copolymer solution may be applied to a variety of surfaces. These acrylic copolymers are suitable for coating the surfaces of metals (iron, steel, copper, brass, aluminum, nickel, chrome, etc.), glass, ceramics, plastics, wood, textiles, paper, leather, rubber, etc. The acrylic copolymer solution may be formulated with coating composition additives such as colorants (e.g. pigments, dyes, etc.), extenders, fillers, wetting agents, cross-linking agents (e.g. polyvalent metal oxide, basic salts or salt of weak acids, urea or melamine-formaldehyde condensates, epoxides, etc.) waxes and the like to suit the desired coating application.

In the absence of conventional cross-linking reagents capable of reacting with acrylic copolymers, the present copolymers fail to possess sufficient water-resistance to be used as an internal can coating. Organic solvent-resistant and water-resistant, cured coatings possessing excellent internal can coating attributes are obtained by formulating the acrylic copolymer solution with thermosetting agents which chemically react and form cross-linkages between the acrylic copolymers upon curing. Those cross-linking reagents which react and cross-link with the acid moieties of the acrylic copolymer are generally effective for this purpose. The cross-linking agents should possess sufficient dispersibility or solubility in the acrylic copolymer solution to homogeneously disperse throughout the coating formulation. If desired, water-miscible, organic, polar solvents (e.g. such as mentioned above) may be used to homogeneously disperse the cross-linking reagent throughout the curable acrylic copolymer composition. Similarly, colloidal dispersants or protective colloids or stabilizers (e.g. emulsifying agents which decompose or become inert upon curing without adversely affecting the coating preparation) may be used, if desired, to stabilize and homogeneously disperse the water-insoluble, cross-linking reagents into the curable coating composition. Particularly effective are the water-soluble, heat-curable, cross-linking reagents.

Illustrative cross-linking reagents for the curable coating compositions include polyepoxides of a water-soluble or a water-dispersible character such as the aliphatic diepoxide obtained by the condensation of epichlorohydrin with polyols ("Bis-Phenol-A", glycols, glycerol, etc.) or peracetic acid with olefins (e.g. Araldite 297, Epon 582, etc.) and the water-soluble or water-dispersible aminoplasts such as the reaction products of an aldehyde (e.g., formaldehyde, acetaldehyde, paraformaldehyde, trioxane, etc.) with urea, thiourea, melamine, benzoguanamine, acetoguanamine, dicyandiamine and the like. The aminoplast resins may be etherified with a lower alcohol such as methyl, ethyl, butyl, isobutyl, propyl or isopropyl alcohol. Additional aminoplasts, include (1) melamine, (2) N-substituted melamine wherein from 1-3 of the amino hydrogen atoms are replaced with alkyl, cycloalkyl, aryl, or acyl groups containing one to six carbon atoms, such as 2,4-diamino-6-methylamino-s-triazine, 2,4-diamono-6-dimethylamino-s-triazine, 2,4-diamino-6-phenylamino-s-triazine, 2,4-diamino-6-acetylamino-s-triazine, 2,4-diamino-6-butylamino-s-triazine, 2-amino-4-, 6-di(cyclohexylamino)-s-triazine, 2-amino-4-,6-di(methylamine)-s- triazine, 2-amino-4-methylamino-6-dimethylamino-s-triazine, 2,4,6-tri(methylamino)-s-triazine, 2,4,6-tri(cyclohexylamino)-s-triazine, 2-amino-4-butylamino-6-methylamino-triazone, (3) aldehyde condensates of such melamine compounds such as melamine/formaldehyde condensates and (4) alkylated melamine formaldehyde condensates. The preferred cross-linking reagents are the methylated urea-formaldehyde resins, the alkylated benzoguanamines, and methylated melamine-formaldehyde resins with the latter being the most acceptable cross-linking reagents for internal can coating formulations.

The hardness or softness of the coating may be altered and controlled by the extent of cross-linking. The dry weight ratio of acrylic copolymer to cross-linking reagent generally ranges from 19:1 to about 2:3. Below the 9:1 weight ratio, the cured coatings are very soft but flexible while above the 1:1 weight ratio, they are relatively hard and brittle. For most internal can coating applications, the dry solids weight ratio of acrylic copolymer to cross-linking reagent will range from 9:1 to 3:2 with particularly effective cured internal can coating results being achieved at a weight ratio ranging from about 6:1 to about 2:1.

Homogeneous dispersions or solutions of the acrylic solution copolymers and cross-linking reagents provide a water-borne, thermosetting coating formulation. These formulations are adapted to provide continuous, adhesive coatings for metal substrates. Their viscosity, drying adhesion, tack and leveling characteristics (e.g., freedom from blistering, pinholing, cratering, void formations, etc.) afford effective use in high-speed, industrial can fabricating and metal coating operations. Conventional application means such as roller coating, spraying, brushing, dipping, etc. may be used to apply the coating to a metal substrate. The aqueous based coatings readily dry and heat-set to form a uniform, continuous, metal-adherent coating essentially free from craters, pinholes, blisters and voids. Uniform, continuous, cured coatings for metal surfaces ranging from thin coatings (e.g., 0.025 mil) to thick coatings (e.g., 1.3 mil) may easily be prepared. The invention is particularly well suited to coat metal substrates at film thicknesses ranging from about 0.1 to about 0.6 mil (preferably about 0.2 to about 0.5 mil). The heat-cured coatings have exceptional flexibility, hardness, tensile strength, toughness, and resistance towards abrasion, detergents, water, acids, bases, organic solvents (polar and nonpolar), fracture, separation from metal surfaces, etc. The cured coatings are inert and thermally stable, and may be used in a wide variety of internal can coating applications.

The following examples are illustrative of the invention.

EXAMPLE I

The following solutions were prepared to prepare an acrylic copolymer solution:

| | INGREDIENTS | PARTS BY WEIGHT (pbw) |
|---|---|---|
| Reactor Charge | n-Propanol | 20.71 |
| | Hydrogen Peroxide, 35% | 2.63 |
| Monomer Premix | Ethyl Acrylate | 27.56 |
| | Methyl Acrylate | 33.53 |
| | Methacrylic Acid | 5.87 |
| | Methyl Methacrylate | 2.28 |
| Activator Solution | Ascorbic Acid | 0.96 |
| | Water | 2.51 |
| | n-Propanol | 2.51 |

| | INGREDIENTS | PARTS BY WEIGHT (pbw) |
|---|---|---|
| Post Catalyst | Hydrogen Peroxide, 35% | 0.12 |
| | n-Propanol | 0.60 |
| Post Treatment | Hydrogen Peroxide, 35% | 0.12 |
| | n-Propanol | 0.60 |
| | Total | 100.00 |

The polymerization reaction was conducted in a closed, nitrogen-blanketed system. The aforementioned monomer premix, activator solution, post catalyst and post treatment ingredients were separately charged to nitrogen-blanketed retaining vessels equipped with valves and metering devices to control the ingredient addition rate. The polymerization reactor (equipped with a continuous stirrer and water jacket) was charged with the 20.71 pbw n-propanol (i.e., reactor charge portion). The polymerization reactor was then blanketed with nitrogen and the 2.63 pbw hydrogen peroxide (i.e., reactor charge portion) was charged to the reactor in two equal aliquots. The polymerization media was heated to 195°–200° F. and the reactor was charged with 8% of the total activator solution (i.e., 0.48 pbw). The monomer premix and activator ingredients were simultaneously and continuously added to the polymerization reactor at a rate sufficient to maintain the reactor temperature at 195°–200° F. (approximately 0.289 monomer parts per weight/min. and about 0.02 parts by weight activator/min.). Four hours after initiating the polymerization reaction, the monomer premix had been fully charged to the reactor and after five hours the activator solution charge was completed. After the monomer addition (4 hrs.), the reaction was allowed to copolymerize at 195°–200° F. under agitation for an additional one-half hour. Then the post catalyst ingredients were sequentially charged to the reactor in 5 aliquots (0.144 pbw) with a one minute delay between charges. The polymerization media was then held at 195°–200° F. for an additional one-half hour. The post treatment ingredients were then charged to the reactor and the reactants were copolymerized for an additional one-half hour at 195°–200° F. The polymerization reaction having been completed within about 400 minutes was then slowly cooled to 105° F.

The resultant acrylic copolymer solution comprised 70% dry solids (69.2% copolymer) with the balance being aqueous propanol (24% propanol and 4.3% water). Brookfield viscosity of the acrylic copolymer solution was 12,500 (20 rpm, #5 spindle at 25° C.) and it contained less than 0.05% free monomer (total solution weight basis).

The acrylic copolymer glass transition temperature ($T_g$) was determined by a differential scanning calorimeter (Perkin-Elmer, Model DSC-1) with 173°–673K° range plug-in, equipped with nitrogen purging and with constant voltage transformers on differential scanning calorimeter and recorder. The testing apparatus included a low temperature sample assembly cover, aluminum sample pans and covers (Perkin-Elmer Cat. No. 219-0041), sample pan crimper press (Perkin-Elmer Cat. No. 219-0024) and Cohn Electrobalance, Model G, with constant voltage transformer. The acrylic copolymer had a $T_g$ of a $-19°$ C.

The weight-average molecular size and molecular weight distribution (i.e., $\bar{A}_w/\bar{A}_n$ ratio) of the acrylic copolymer were determined by gel permeation chromatography in accordance with the methodology disclosed in U.S. Pat. No. 3,825,514 by Drury et al. (Solvent-tetrahydrofuran at 1% weight dry copolymer solids concentration, calibration — Styrogel, sensitivity — 2 × 100 at 25° C.). The respective heights of the chromatographic curve at the designated molecular weights were: 26,500 at 1, 27,000 at 6, 27,500 at 18, 28,000 at 41, 28,500 at 77, 29,000 at 108, 29,500 at 128, 30,500 at 119, 31,000 at 98, 31,500 at 86, 32,000 at 70, 32,500 at 49, 33,000 at 29, 33,500 at 17, 34,000 at 11, 34,500 at 8, 35,000 at 6, 35,500 at 4, 36,000 at 2 and 36,500 at 1.0. The weight average molecular weight was 29,600, weight average length (in angstroms) was 686 and the number average length (in angstroms) was 308 to provide an acrylic copolymer $\bar{A}_w/\bar{A}_n$ ratio of 2.23. The acrylic copolymer solution was then used in Example II to coat can stock.

EXAMPLE II — INTERIOR CAN COATING

An internal can coating composition was prepared by initially preparing a 20% carnauba wax dispersion by premixing 103 pounds demineralized water with 11 pounds aqua ammonia (26° Bé), 40 pounds ethanol (methanol denatured) and 40 pounds ethylene glycol monobutyl ether. The resultant homogeneous premix was then added to 197 pounds of the Example I acrylic copolymer solution. After thoroughly mixing, the acrylic copolymer solution and premix were added to a Pebble Mill along with 409 pounds demineralized water and 200 pounds #2 yellow carnauba wax (powdered), and the ingredients were then ground for 72 hours. The resultant 20% carnauba wax dispersion was characterized as providing coatings which were free from cratering.

Employing 4.81 pounds of the aforementioned 20% carnauba wax dispersion, an interior can coating formulation was prepared by homogeneously mixing together the following ingredients:

|  | Pounds |
|---|---|
| Acrylic copolymer solution (Example I) | 321.88 |
| Methylated Melamine Resin[1] | 57.69 |
| Ammonia (28% Solution) | 18.03 |
| Butyl Cellosolve | 30.00 |
| Ethyl Alcohol (35%) | 20.00 |
| Water | 547.59 |
| 20% Carnauba Wax Dispersion | 4.81 |

The resultant homogeneous mixture (Brookfield viscosity of 225 cps at 25° C., #1 spindle and at 20 rpm) was diluted and mixed with 333 pounds water to provide an internal can coating composition having a Brookfield viscosity of 150 cps (25° C., #1 spindle at 20 rpm). The coating composition was applied to tin-free steel can stock with a #14 wire wound bar, baked for 10 minutes at 400° F. in a high velocity forced air oven to provide a 0.23 mil dry coating (4.5 mg/in$^2$).

Cured coatings on treated tin-free can stock, treated and untreated aluminum can stock exhibited flexibility and adhesion to the can stocks as evidenced by a OT-IT flexibility test rating. The cured can stock coatings had sufficient flexibility to qualify for use as internal coatings for can closures and ends as well as main can bodies. The coating and curing attributes of the can coating formulation were suitably adapted for use in high-speed, internal can coating operations.

On tin-free steel and aluminum can stocks, commercially treated panels showed no blushing, loss of adhesion, or corrosion after immersion for 30 days at 120°0 F. in a standard carbonated cola. Identical cured and coated panels immersed in beer for 15 days at 120° F. showed no adverse effect to the coating. When tested in accordance with FDA 121.2514 (D) and (E), the cured coating exhibited extractables of 0.01 to 0.08 mg/sq.in. and the cured coatings complied with the maximum 0.50 mg/sq.in. restrictions placed upon coatings which are in direct contact with foods. Pencil hardness values of the baked coatings ranged from F to 2H.

The acrylic copolymer coating formulation was compatible with commercially methylated melamine and urea resins. If a greater degree of wettability is desired, formulation changes such as adding diethylene glycol or propylene glycol, or reducing solids to 25% and employing the butyl cellosolve with ethanol or an acceptable food grade surfactant may be used. If desired, acceptable defoamers may also be incorporated into the formulation.

EXAMPLE III

An acrylic copolymer suitable for use in internal can coating formulations was prepared in a closed two liter reactor from the following ingredients:

|  | Grams |
|---|---|
| (A) MONOMER MIX |  |
| Ethyl Acrylate | 159.0 |
| Methyl Methacrylate | 13.0 |
| Methyl Acrylate | 194.0 |
| Methacrylic Acid | 34.0 |
| (B) REACTOR CHARGE |  |
| Acetone | 140.6 |
| n-Propanol | 140.6 |
| (C) ACTIVATOR |  |
| Erythorbic Acid | 1.2 |
| n-Propanol | 50.0 |
| Deionized H$_2$O | 25.0 |
| (D) CATALYST |  |
| Hydrogen Peroxide (35%) | 14.2 |
| n-Propanol | 50.0 |
| (F) POST I |  |
| Hydrogen Peroxide (35%) | 1.0 |
| (F) POST II |  |
| 2-Amino2-Methyl-1-propanol (95) (AMP-95) | 15.0 |

Solutions of the above ingredients (A)–(F) were separately prepared and the reactor charge (i.e. (B)) was added to the reactor and heated to reflux (71°–73° C.). Then 10% by weight of both the catalyst (D) and activator (C) solutions was charged to the reactor. The monomer mix (A) was then continuously charged to the reactor over a 3 hour period, with the catalyst (D) and activator (C) solutions being continuously charged thereto over a 3¼ hour period at reflux. Upon completing the activator (C) and catalyst (D) delayed addition to the reactor, 1.0g of hydrogen peroxide was charged thereto coupled with a delayed addition of 15.0g AMP-95 over a 15 minute period. The copolymerization media was then cooled and there was then added additional AMP-95 (approx. 20.0g) to raise its pH to 7.0–7.5. Two hundred grams (200g) of the solvent mix were then distilled (at reflux) from the copolymerization media, after which there was added 200g water and 10g AMP-95 to the reactor. Distillation of the product was then continued until a total of 267.0g of solvent had been distilled off and again there was added 380g water and 10g AMP-95 to the distilled product. If desired the alcohol content may be further reduced (e.g., 5%) by repeating the addition and distillation cycle. The resultant product was then cooled to 35° C. and filtered. The watersoluble resultant acrylic copolymer properties were as follows: pH 8.6; viscosity 900 cps; % solids — 35.0%; % n-Propanol — 10.0%; % water — 55.0%.

Can stock was coated and cured with an interior can coating formulation comprised of the following ingredients as indicated below:

| Example III acrylic copolymer solution | 100.00 |
|---|---|
| AMP-95 | .25 |
| 25% Carnauba Wax (15625-S Michem emulsion²) | 2.00 |
| Resimene X-745³ | 8.00 |
| Water | 32.00 |
| | 142.25 |

²"Michem Emulsion 15625-S" by Michelman Chemicals, Inc. Cincinnati, Ohio
³Cross-linking reagent by the Resin Products Div. of Monsanto Chemical Co., St. Louis, Missouri

| Formulation pH | 9.0-9.5 |
|---|---|
| Application | drawdown with #12 rod |
| Substrate | thin gauge, tin-free steel panel |
| Baking Conditions | 10'min./400° F. - high velocity hot air oven |
| Test Results | MEK Double Rubs 50+ |
| | T-Bend 2T |
| | Pasteurization Passed |
| | (300'min./160° F.) |

In the acid form, the acrylic copolymers of this invention are characterized as being insoluble in water (e.g., 10 grams acrylic copolymer in 100 ml. water at 25° C.). These water-insoluble acrylic copolymers cannot be effectively dispersed in water and used in water-borne coating systems without being converted to the nitrogen base-neutralized salt form. The nitrogen base-neutralized acrylic copolymer salts are soluble in water (e.g., at 50% dry solids level at 25° C.), compatible with aqueous-miscible polar organic solvent systems and water-dispersible or water-soluble cross-linking reagents. The acrylic copolymer solutions may be easily converted to coating compositions which contain less than 20% by volume volatile organics (may be determined by calculating the amount of organics in the coating composition which have a boiling point of less than 400° F. or alternatively by quantitatively ascertaining the amount of organics vaporized from a 0.25 mil thick coating at the desired baking cycle such as at 400° F. for 10 minutes).

If desired, coating compositions essentially free from volatile organic dispersant (e.g., n-Propanol) may be prepared. Since the acrylic copolymers are prepared in the presence of water-miscible organic solvents at a high copolymer solids level, coating compositions complying with most air pollution district requirements are best prepared by diluting the organic solventacrylic copolymer or salt solution with an aqueous volatile base and/or water. These water-miscible organic dispersants will aid in homogeneously dispersing hydrophobic coating adjuncts (e.g., waxes) throughout the coating composition and improve upon the coating compositions coating, adhesion and drying attributes. Accordingly, the coating compositions advantageously contain a minor amount of organic solvents (e.g., at a water to organic solvent weight ratio between about 30:1 to less than 4:1 and preferably between about 12:1 to about 5:1).

What is claimed is:

1. An acrylic copolymer solution suitable for use in conjunction with cross-linking reagents to provide cross-linked coatings, said acrylic copolymer solution comprising an acrylic copolymer and watermiscible organic solvent with said acrylic copolymer consisting essentially of the copolymerization reaction product of:

(a) 5 to less than 16 parts by weight of at least one alpha-beta ethylenically unsaturated carboxylic acid selected from the group consisting of acrylic acid and methacrylic acid;
   (b) 100 parts by weight methyl acrylate and ethyl acrylate with the weight ratio of copolymerized methyl acrylate to ethyl acrylate in said copolymer ranging from about 3:1 to about 1:2; and
   (c) about 1 to 13 parts by weight of a comonomer represented by the structural formula:

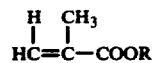

wherein R is an alkyl group of 1 to 4 carbon atoms inclusive, and the volatile base salts thereof, said copolymer being further characterized as having a $T_g$ from about $-30°$ C. to $0°$ C., a weight-average molecular weight to number-average factor between 1/1 to 4/1, a weight-average molecular weight of about 20,000 to about 40,000, insoluble in water and soluble in n-Propanol at 25° C. and 50% by weight acrylic copolymer solids level when said copolymer is in the acid form and forming a water-soluble, acrylic copolymer salt when neutralized with ammonia to a pH ranging from about 7 to about 9.

2. The acrylic copolymer solution according to claim 1 wherein the acrylic copolymer consists essentially of the copolymerizate of about 8 to about 13 parts by weight alpha-beta ethylenically unsaturated carboxylic acid, a methyl acrylate, to ethyl acrylate weight ratio ranging from about 3:2 to about 2:3, and from about 1 to about 13 parts by weight methyl methacrylate and the nitrogen base salts thereof.

3. The acrylic copolymer solution according to claim 2 wherein a lower alkanol containing from 2 to 3 carbon atoms inclusive comprises the major solvent for said acrylic copolymer.

4. The acrylic copolymer solution according to claim 1 wherein the acrylic copolymer is characterized as containing at least 85% by weight copolymerized methyl acrylate and ethyl acrylate, the copolymer has a $T_g$ ranging from about $-20°$ C. to $-5°$ C., a weight-average molecular weight ranging from about 20,000 to about 35,000 and a weight-average molecular weight to number-average molecular weight factor ranging from 3/2 to 3/1.

5. The acrylic copolymer solution according to claim 4 wherein the copolymer consists of the copolymerizate of 100 parts by weight methyl acrylate and ethyl acrylate, about 8 to 13 parts by weight of said alpha-beta ethylenically unsaturated carboxylic acid, from 2 to 9 parts by weight of a $C_1-C_2$ alkyl methacrylate and the copolymer contains a weight ratio of copolymerized methyl acrylate to ethyl acrylate ranging from about 3:2 to about 2:3.

6. The acrylic copolymer solution according to claim 3 wherein the acrylic copolymer has a weight-average molecular weight of less than 40,000 and an $\overline{A}_w/\overline{A}_n$ factor ranging from about 7:4 to about 10:4.

7. The acrylic copolymer solution of claim 6 wherein the acrylic copolymer solution on a total weight basis contains from about 60% to about 80% by weight acrylic copolymer solids.

8. The acrylic copolymer solution according to claim 1 wherein the copolymer solution is diluted with water and the copolymer is neutralized with a volatile nitrogen base in an amount sufficient to raise the pH of the diluted acrylic copolymer solution to at least a pH 6.5.

9. The acrylic copolymer solution of claim 8 wherein the copolymer is neutralized with aqueous ammonium hydroxide to a pH ranging from about 7 to about 10 to provide the water-soluble ammonium salt of said acrylic copolymer.

10. The acrylic copolymer solution of claim 3 wherein the acrylic copolymer is neutralized and diluted with a sufficient amount of aqueous ammonia to dilute the acrylic copolymer solution to less than 20% by volume volatile organics and to neutralize the solution to a basic pH and provide the water-soluble ammonium salt of said acrylic copolymer.

11. The acrylic copolymer solution according to claim 10 wherein the acrylic copolymer solution is characterized by a Brookfield viscosity ranging from about 25 cps to about 1000 cps.

12. The acrylic copolymer solution according to claim 1 wherein the acrylic copolymer consists essentially of from about 9 to about 11 parts by weight alpha-beta ethylenically unsaturated acid, from 2 to 9 parts by weight methyl methacrylate and 100 parts by weight of methyl acrylate and ethyl acrylate with the weight ratio of methyl acrylate to ethyl acrylate ranging from about 3:2 to about 2:3.

13. The acrylic copolymer solution according to claim 12 wherein the solution contains water and a water-miscible volatile polar organic solvent at a weight ratio of polar organic solvent to water ranging from about 3:1 to about 15:1.

14. The acrylic copolymer solution according to claim 13 wherein the $T_g$ of the acrylic copolymer ranges from about $-30°$ C., to about $-5°$ C., the weight-average molecular weight ranges from about 25,000 to about 40,000 and the $\bar{A}_w/\bar{A}_n$ ranges from about 7:4 to about 10:4.

15. The acrylic copolymer solution according to claim 14 wherein the acrylic copolymer is neutralized with a volatile nitrogen base to a basic pH and diluted with a sufficient amount of water to provide an acrylic copolymer solution which contains less than 20% by volume volatile organics.

16. The acrylic copolymer solution according to claim 5 wherein at least 50% of the total solution weight is comprised of the ammonium salt of said acrylic copolymer, n-Propanol comprises at least a major weight portion of the total amount of water-miscible polar organic solvent in said solution and the solution contains a weight ratio of water to n-Propanol ranging from about 19:1 to less than 4:1.

17. The acrylic copolymer ammonium salt solution according to claim 16 wherein the viscosity of the solution ranges from about 100 cps to about 350 cps., the solution contains from about 10% to about 35% by weight copolymer solid and the weight ratio of water to organic solvent ranges from about 12:1 to about 5:1.

18. A homogeneous aqueous thermosetting coating composition adapted to provide a cross-linked and thermoset coating upon curing at elevated temperatures, said coating composition comprising:
(A) water as the predominate volatile liquid dispersant and solvent for said coating composition;
(B) a water-soluble, base salt of an acrylic copolymer, said copolymer consisting essentially of the copolymerizate of:
(a) 5 to less than 16 parts by weight of at least one alpha-beta ethylenically unsaturated carboxylic acid selected from the group consisting of acrylic acid and methacrylic acid;
(b) 100 parts by weight methyl acrylate and ethyl acrylate with the weight ratio of said copolymerized methyl acrylate to said ethyl acrylate in said copolymer ranging from about 3:1 to about 1:2; and
(c) about 1 to 13 parts by weight of a comonomer represented by the structural formula:

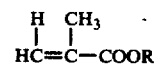

wherein R is an alkyl group of 1 to 4 carbon atoms inclusive; said copolymerizate being further characterized as having a $T_g$ from about $-30°$ C. to 0° C., a weight average molecular weight to number-average factor between 1/1 to 4/1, a weight-average molecular weight of about 20,000 to about 40,000, soluble in n-Propanol (at 25° C. and 50% by weight acrylic copolymer solids level), insoluble in water and forming a water-soluble, acrylic copolymer when neutralized with ammonia to a pH ranging from about 7 to about 9; and
(C) a cross-linking reagent homogeneously dispersed throughout said coating composition in an amount sufficient to permit dried coatings of the coating composition to form thermoset coatings when the coating is cured at elevated temperatures.

19. The coating composition according to claim 18 wherein the the copolymerizate contains 100 parts by weight ethyl acrylate and methyl acrylate at a methyl acrylate to ethyl acrylate weight ratio ranging from about 3:2 to about 2:3, from about 8 to about 13 parts by weight alpha-beta ethylenically unsaturated carboxylic acid, and from about 2 to about 9 parts by weight methyl methacrylate, the acrylic copolymer has an $\bar{A}_w/\bar{A}_n$ factor ranging from about 7:4 to about 10:4, the coating composition contains less than 20% by weight volume volatile organics, the coating composition has a basic pH and the acrylic copolymer is neutralized with a water-soluble, volatile, nitrogen base to provide the water-soluble acrylic copolymer salt thereof.

20. The coating composition according to claim 19 wherein the coating composition has a pH ranging from about 7.5 to about 9.0, the water-soluble acrylic copolymer salt consists essentially of the ammonium salt of the acrylic copolymer and the dry solids weight ratio of water-soluble acrylic copolymer ammonium salt to cross-linking reagent ranges from about 19:1 to about 2:3.

21. The coating composition according to claim 20 wherein the coating composition viscosity ranges from about 100cps. to about 350 cps. and the copolymer dry solids content ranges from about 15% to about 25% by weight of the total coating composition weight.

22. A substrate wherein at least a portion of the substrate surface is coated with the cured coating of the claim 18 coating composition.

23. A metal substrate coated with the cured, thermoset and crosslinked coating composition of claim 19.

24. A metal substrate wherein at least a portion of the metal substrate surface is coated and thermally cured to a thermoset coating of the coating composition of claim 20.

25. The coated metal substrate according to claim 24 wherein the metal substrate comprises the interior of a metal can stock.

26. A can stock wherein the interior of the can stock is coated with the thermoset and cross-linked coating of the coating composition of claim 21.

27. In a method of coating a substrate with a curable composition wherein the curable composition contains a volatile liquid dispersant for the solid coating constituents of said coating composition, a cross-linking reagent and a polymer which reacts with the cross-linking reagent to provide a cross-linked and thermoset coating upon curing, the improvement which comprises:

(I) preparing a homogeneous aqueous coating composition comprised of water as the major volatile dispersant for said coating composition, a cross-linking reagent homogeneously dispersed throughout the coating composition and a water-soluble acrylic copolymer salt, said acrylic copolymer consisting essentially of the copolymerization reaction product of:
(a) 5 to less than 16 parts by weight of at least one alpha-beta ethylenically unsaturated carboxylic acid selected from the group consisting of acrylic acid and methacrylic acid;
(b) 100 parts by weight of at least one monomer selected from the group consisting of methyl acrylate and ethyl acrylate;
(c) 0 to 13 parts by weight comonomer represented by the structural formula:

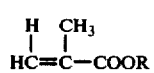

wherein R is an alkyl group of 1 to 4 carbon atoms inclusive; said copolymer being further characterized as having a $T_g$ from about $-30°$ C. to $0°$ C., a weightaverage molecular weight of about 20,000 to about 40,000, soluble in n-Propanol at $25°$ C. and 50% by weight acrylic copolymer solids level and insoluble in water, said copolymer being neutralized to a water-soluble copolymer salt with a sufficient amount of volatile nitrogen base to provide a coating composition having a pH of at least 6.5 with the proportion of said copolymer salt and cross-linking reagent being sufficient to provide a thermoset coating of said coating composition, (II) coating a substrate with said coating composition; and (III) curing the coated substrate at elevated temperatures and conditions sufficient to convert the coating composition to a thermoset, cross-linked coating.

28. The method according to claim 27 wherein the acrylic copolymer consists essentially of the copolymerizate of about 8 to about 13 parts by weight alpha-beta ethylenically unsaturated carboxylic acid, 100 parts by weight methyl acrylate and ethyl acrylate, from about 1 to about 13 parts by weight methyl methacrylate, the coating composition has a pH ranging from about 7.0 to about 10 and contains water and a water-miscible, volatile organic polar solvent with the total amount of volatile organics in said coating composition being no greater than 20% by volume of the total volume of said coating composition.

29. The method according to claim 28 wherein the copolymerizate contains from about 9 to about 11 parts by weight alpha-beta ethylenically unsaturated acid, from 2 to 9 parts by weight methyl methacrylate and the weight ratio of methyl acrylate to ethyl acrylate ranges from about 3:2 to about 2:3 with at least 85% of the copolymerizate weight being comprised of said ethyl acrylate and said methyl acrylate.

30. The method according to claim 29 wherein the water-soluble, acrylic copolymer is neutralized with ammonium hydroxide to provide the water-soluble, ammonium salt of said acrylic copolymer.

31. The method according to claim 28 wherein the substrate is a metal substrate.

32. The method according to claim 30 wherein the interior of a metal container stock is coated and cured to a thermoset coating of a thickness ranging from about 0.1 mil. to 0.6 mil.

33. The method according to claim 32 wherein the $T_g$ of the acrylic copolymer ranges from about $-20°$ C. to about $-5°$ C., the weight-average molecular weight ranges from about 25,000 to 40,000 and the $\overline{A}_w/\overline{A}_n$ ratio ranges from about 7/4 to about 10/4.

34. The method according to claim 33 wherein the viscosity of the coating composition ranges from about 100 cps. to about 350 cps., the coating composition contains from about 10% to about 35% by weight copolymer solids, the weight ratio of water to water-miscible organic solvent ranges from less than 4:1 to about 30:1, the acrylic copolymer to crosslinking reagent weight ratio ranges from about 6:1 to about 2:1 and the coating is cured to a thickness ranging from about 0.2 to about 0.5 mil.

35. The method according to claim 34 wherein the acrylic copolymer is neutralized with ammonium hydroxide to a pH ranging from about 7.5 to about 9.0.

36. A method for preparing an acrylic copolymer solution having an average molecular weight of about 20,000 to about 50,000 and a $T_g$ of less than $10°$ C., said method comprising copolymerizing:
(a) 5 to less than 16 parts by weight of at least one alpha-beta ethylenically unsaturated carboxylic acid comonomer selected from the group consisting of acrylic acid and methacrylic acid;
(b) 100 parts by weight of at least one comonomer selected from the group consisting of methyl acrylate and ethyl acrylate; and
(c) 0 to 13 parts by weight of a comonomer represented by the structural formula:

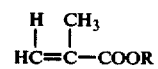

wherein R is an alkyl group of 1 to 4 carbon atoms inclusive; wherein the copolymerizing of monomers (a)–(c) is conducted under solvent copolymerization conditions in the presence of a redox catalyst system and water-miscible organic solvent which functions as a chain terminator and a solvent for said comonomers and copolymerized comonomers under conditions sufficient to provide an acrylic copolymer having a weight-average molecular weight ranging between about 20,000 to about 50,000, a $T_g$ of less than $10°$ C., insoluble in water, soluble in n-Propanol and forming a water-soluble copolymer salt when neutralized with aqueous ammonia to a basic pH.

37. The method according to claim 36 wherein the principal watermiscible organic polar solvent comprises an alkanol containing from 2 to 3 carbon atoms inclusive, the catalyst system comprises hydrogen peroxide and at least one activator selected from the group consisting of ascorbic acid and erythorbic acid.

38. The method according to claim 37 wherein the copolymerization is conducted in the presence of water and is accomplished by incrementally charging the comonomer and at least a portion of the catalyst system to the copolymerization site, the average molecular weight of acrylic copolymer ranges from about 20,000 to about 40,000 and a sufficient amount of comonomers are copolymerized to provide an acrylic copolymer solution which contains from about 60% to about 80% by weight copolymer dry solids.

39. The method according to claim 38 wherein the copolymerization comprises about 8 to 13 parts by weight of said alpha-beta ethylenically unsaturated carboxylic acid, from 2 to 9 parts by weight of a $C_1$–$C_2$ alkyl methacrylate and the weight ratio of copolymerized metyl acrylate to ethyl acrylate ranges from about 3:1 to about 1:2.

40. The method according to claim 37 wherein the copolymerization is conducted in the presence of n-Propanol and water at a weight ratio ranging from 9:1 to about 4:1, from 2 to 9 parts by weight methyl methacrylate, from 8 to 13 parts by weight alpha-beta ethylenically unsaturated carboxylic acid and 100 parts by weight ethyl acrylate and methyl acrylate with the weight ratio of methyl acrylate to ethyl acrylate ranging from about 3:2 to about 2:3, the $\overline{A}_w/\overline{A}_n$ ranges from 3/2 to 3/1, the weightaverage molecular weight ranges from about 20,000 to about 35,000, and the $T_g$ ranges from about −5° C. to about −30° C.

* * * * *